J. H. CURRIE.
TAPELINE HOLDER.
APPLICATION FILED OCT. 5, 1920.

1,408,347.

Patented Feb. 28, 1922.

WITNESS:
A. D. Whitworth.

John H. Currie
INVENTOR

BY Victor J. Evans
ATTORNEY

UNITED STATES PATENT OFFICE.

JOHN H. CURRIE, OF WEBSTER, MASSACHUSETTS.

TAPELINE HOLDER.

1,408,347.   Specification of Letters Patent.   Patented Feb. 28, 1922.

Application filed October 5, 1920. Serial No. 414,929.

*To all whom it may concern:*

Be it known that I, JOHN H. CURRIE, a citizen of the United States, residing at Webster, in the county of Worcester and State of Massachusetts, have invented new and useful Improvements in Tapeline Holders, of which the following is a specification.

My present invention has reference to an attachment for spring wound tape lines and provides a means whereby the end of the line may be held upon an article or object which is being measured.

A further object is the production of a holding device for the outer end of spring wound tape lines in the nature of an element which is removably attached to the eye at the said outer end of the tape line and which is provided with means for contracting with or entering the article or object to be measured whereby to hold the outer end of the line thereagainst, the said holding means being readily released.

A further object is the production of a holder devised for spring influenced tape lines which may be readily attached to any ordinary construction of such lines and may remain a permanent feature thereof, as well as one which may be cheaply constructed, easily operated and thoroughly efficient for the purpose for which it is devised.

The drawings accompanying and forming part of this application, illustrate a satisfactory embodiment of the improvement reduced to practice.

In the drawings:—

The tape line 1 is received in a suitable casing 2, and is spring influenced to wind the same inward in the casing, in the usual manner. The line 1 has its outer end provided with the usual ring member or eye 3 that contacts with the wall adjacent the slit in the casing through which the tape line passes to prevent the entrance of the end of the tape line in the casing as well as to provide the finger grip or manipulating element for drawing the line out of the casing.

Figure 1:
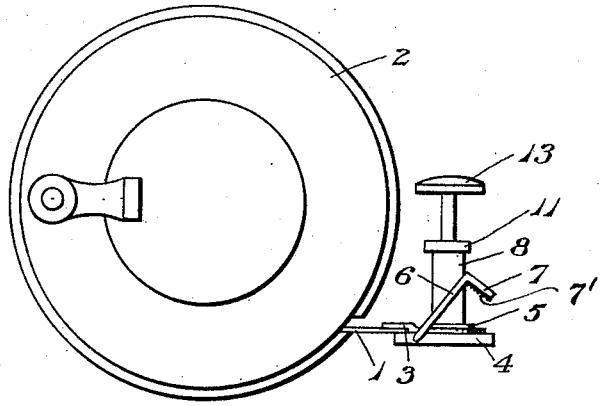
Figure 1 is an elevation of a spring influenced tape line casing having the improvement attached to the end of the tape line.
Figure 4:
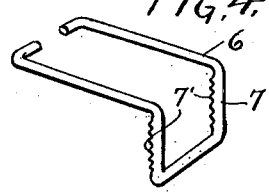
Figure 4 is a perspective view of the clip.
Figure 2:
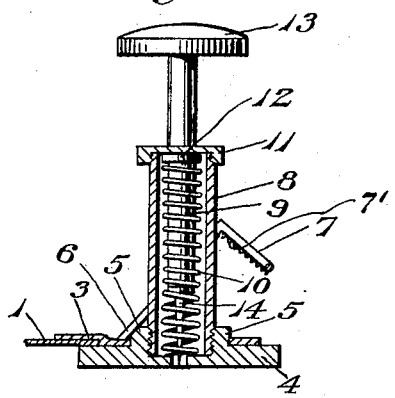
Figure 2 is an enlarged side elevation of the improvement attached to the end of the tape line, parts being in section.
Figure 3:
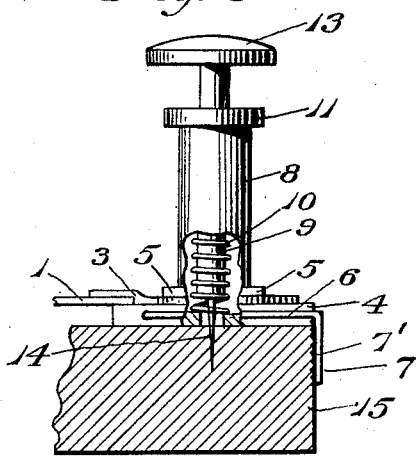
Figure 3 is an elevation, parts being broken away and parts being in section, illustrating the manner in which both the pin and angle clip are operated to hold the tape line on an object to be measured.

My improvement comprises a substantially rectangular base 4 that has on its upper face a threaded boss 5 of a size to receive the ring 3 of the tape line thereon. On the base there is pivotally connected a substantially U-shaped member which I shall refer to as a clip. The side arms of the clip 6 have their ends inturned and enter suitable bearing openings in the sides of the base 4. The arms project a suitable distance beyond the front edge of the base and are turned downwardly to provide the outer edge of the clip with an angle substantially U-shaped engaging portion 7. The clip, when not in use, may be swung upwardly of the base, against a barrel 8 which threadedly engages with the boss 5 but when in use the same is swung downwardly so that the end 7 thereof will engage with an object to hold the line thereon so that measurements may be made, as illustrated in Figure 3 of the drawings.

The barrel 8 has its end opposite that connected to the base 4 closed by a flanged cap 11, the latter preferably threadedly engaging the barrel. Entering the barrel through a central opening in the cap 11 is a plunger rod 9. On the plunger rod is a flange 12 that is forced in contact with the cap 11 through the medium of a spring 10 which surrounds the portion of the plunger rod in the barrel and which exerts a pressure between the base 4 and the flange 12. The outer end of the plunger rod 9 is provided with a head 13, and the inner end of the said plunger rod has centrally projecting therefrom a pin 14. The spring, exerting a pressure between the base and the flange of the plunger rod normally retains the pin in the barrel 8, but a pressure on the head 13 in the direction of the barrel will move the plunger rod toward the barrel and force the pin 14 through a restricted opening in the base 4. The pin is employed when measurements are taken on comparatively soft objects, such as wood or the like, and the clip is employed when measurements are to be taken upon hardened objects, such as metal. The operation of both of the holding elements 14 and 7 is illustrated in Figure 3 of the drawings.

The engaging surface of the swinging holder is toothed or serrated, as at 7', so that the same will more effectively grip the surface with which it engages.

Having thus described the invention, what I claim, is:—

1. In combination with a tape line having an eye at one end thereof, of a holding means therefor including a base having a boss received in the eye of the tape line and a barrel projecting from the boss, a spring influenced plunger rod in the barrel having a headed end projected outwardly therefrom, an impinging element on the inner end of the plunger rod movable through the base when pressure is exerted on the headed end of the plunger rod in the direction of the base, and a clip comprising a U-shaped member which is pivoted to the base and which has a portion bent at an angle to the main portion of the member.

2. A holder for tape lines including a base member and a barrel, a spring influenced plunger rod partly received in the barrel and having an outer headed end, a pin on the inner end of the rod, spring means influencing the rod outward of the barrel and normally sustaining the pin in the barrel, said base being provided with a perforation, said pin being movable through said perforation when pressure is exerted on the headed end of the plunger rod, and a pivoted clip on the holder.

In testimony whereof I affix my signature.

JOHN H. CURRIE.